3,711,375
PROCESS FOR PRODUCING L-THREONINE

Kiyoshi Nakayama, Sagamihara-shi, Haruo Tanaka, Machida-shi, and Hiroshi Kase, Koganei-shi, Japan, assignors to Kyowa Hakko Kogyo Co., Ltd., Tokyo, Japan
No Drawing. Continuation of abandoned application Ser. No. 698,424, Jan. 17, 1968. This application June 14, 1968, Ser. No. 736,979
Claims priority, application Japan, Jan. 21, 1967, 42/3,862
Int. Cl. C12b 1/00
U.S. Cl. 195—29                    11 Claims

ABSTRACT OF THE DISCLOSURE

A process for producing L-threonine by fermentation which comprises culturing an L-threonine-producing microorganism under aerobic conditions in an aqueous nutrient medium containing a decomposate of the cell bodies of diaminopimelic acid-containing microorganisms. The decomposate acts as a substitute for diaminopimelic acid itself, it being obtained, for example, by the hydrolysis of diaminopimelic acid-containing microorganisms.

CROSS-REFERENCE TO RELATED APPLICATION

This application is a continuation of copending application Ser. No. 698,424, filed on Jan. 17, 1968, now abandoned.

This invention relates to a process for producing L-threonine. More particularly, it relates to a process for the production of L-threonine by fermentation. Even more particularly, the invention relates to a process for the production of L-threonine by fermentation with microorganisms in an aqueous nutrient medium containing certain specified additives.

As is well known, L-threonine is an amino acid which is important as a so-called essential amino acid for the nourishment of humans and animals. L-threonine is contained in a small amount in cereal proteins and is a markedly useful substance as an amino acid which improves the nutritive values of cereal proteins when these are supplemented therewith.

Methods for producing L-threonine by fermentation have been described in the prior art. These involve, for example, the use of homoserine as a substrate (U.S. Pat. 3,099,604, Japanese patent publication 36/2,896, and methods in which diaminopimelic acid-requiring strains of microorganisms are used (U.S. Pat. 2,937,121 and U.S. Pat. 2,937,122).

Noting the advantages that threonine produced in a fermentation process is of the L-type and that no optical resolution is therefore required as in a synthesis procedure, the present inventors made repeated studies on methods for producing L-threonine by an effective fermentation process.

Accordingly, one of the objects of the present invention is to provide an improved process for the production of L-threonine which overcomes the disadvantages and deficiencies of the prior art methods.

Another object of the present invention is to provide a process for producing L-threonine by fermentation which may be carried out in an efficacious and simple manner.

A further object of the invention is to provide a process for producing L-threonine by fermentation which may be carried out advantageously on an industrial scale at low cost using inexpensive starting materials to give a high yield of product.

A still further object of the invention is to provide L-threonine.

These and other objects and advantages of the present invention will become apparent to those skilled in the art from a consideration of the following specification and claims.

In accordance with the present invention, the phenomenon has been found that the amount of L-threonine produced in a fermentation process is greatly increased when the medium used for culturing an L-threonine-producing strain contains a decomposition liquid of the cell bodies of microorganisms containing diaminopimelic acid. In this way, the fermentation process may be effected with the decomposates acting as a substitute for diaminopimelic acid, which is generally not contained in proteins and which is an expensive amino acid. As a result, an advantageous fermentation process for the production of L-threonine has been found in accordance with the present invention since the decomposates of microorganism cell bodies are inexpensive substitutes for diaminopimelic acid. Microorganism cell body decomposates not only satisfy the diaminopimelic acid requirement of microorganisms used for the production of L-threonine, but also increase the yield of L-threonine obtained. Moreover, when the microorganism cell body decomposates are employed in culture media used for producing L-threonine with strains which do not require diaminopimelic acid, it has been found that they are also effective in increasing the production of L-threonine.

L-threonine-producing strains to be used in the present invention are any of those known in the art. These include the general L-threonine-producing strains, regardless of classification, such as bacteria, molds (including fungi imperfecti), yeasts and actinomycetes. These are exemplified in the examples hereinbelow, wherein microorganisms belonging to generea such as Escherichia, Brevibacterium, Corynebacterium, Xanthomonas, Sarcina, Micrococcus, Vibrio, Bacillus, Proteus and Aerobacter are employed. However, it is to be again emphasized that these are merely exemplary of the wide range of microorganisms which can be employed in the present invention effectively for producing L-threonine by fermentation.

The aqueous nutrient media employed in accordance with the process of the present invention are characterized in that they contain, as noted above, decomposates of the cell bodies of microorganisms containing diaminopimelic acid. As starting materials for the preparation of said decomposates, microorganisms containing diaminopimelic acid are used, in general. Yeasts and molds containing no diaminopimelic acid are not used. Exemplary microorganisms which may be employed for obtaining the decomposates include various bacter such as *Pseudomonas aeruginosa, Acetobacter xylinum, Azotobacter chroococcum, Escherichia coli, Aerobacter aerogenes, Proteus vulgaris, Propionibacterium rubrum, Lactobacillus plantarum, Corynebacterium rathayi, Brevibacterium ammoniagenes, Arthrobacter globiformis* and *Bacillus subtilis*, actinomycetes such as *Nocardia asteroides, Strepomyces griseus* and *Streptomyces fradiae*, and algae such as *Anabaena variabilis, Anacistis nidurans* and *Chlorella pyrenoidosa*. The substances obtained by decomposing microorganisms such as these according to a suitable process so as to contain free diaminopimelic acid are used as starting materials in the fermentation media in the present invention. As the processes to be used for decomposition, various processes can be employed, such as hydrolysis using an acid or alkali, enzymatic action using protease or a bacteriolytic enzyme or autolytic processes.

The cell body decomposates may be used at various concentrations in any of the seed and/or fermentation media. Generally, however, they are preferably used, in the case of fermentation media, at concentrations of from about 1 g./l. to about 200 g./l., calculated on the basis of the dry amounts of cell bodies before decomposition.

As to the other components employed in the nutrient media, those generally used for the culturing of microorganisms are employed. Thus, either a synthetic culture medium or a natural nutrient medium is suitable in the present invention as long as it contains the essential nutrients for the growth of the strain employed. Such nutrients are well known in the art and include substances such as a carbon source, a nitrogen source, inorganic compounds and the like which are utilized by them icroorganism employed in appropriate amounts.

Thus, as a carbon source, there may be mentioned, by way of example, carbohydrates such as glucose, fructose, maltose, sucrose, starch, starch hydrolysate, molasses, etc., or any other suitable carbon source such as glycerol, mannitol, sorbitol, organic acids, etc. These substances may be used either singly or in mixtures of two or more. As a nitrogen source, various kinds of inorganic or organic salts or compounds, such as urea or ammnium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, or other appropriate and suitable metallic salts.

Cultivation is effected under aerobic conditions, such as aerobic shaking of the culture or with aeration and stirring of a submerged culture, at a temperature of about 20 to 45° C. and at a pH of about 3.0 to 9.0. These conditions are those generally employed for the cultivation of microorganisms. Ordinarily, after a culturing period of about 2 to 3 days, substantial amounts of L-threonine are produced and accumulated in the culture liquor.

After the completion of fermentation, the L-threonine is separated from the fermentation liquor by conventional means, such as ion exchange resin treatment, extraction with solvents, precipitation with metallic salts, chromatography, or the like.

The following examples are given merely as illustrative of the present invention and are not to be considered as limiting. Unless otherwise noted, the percentages therein are by weight.

EXAMPLE 1

*Escherichia coli* 29–D4 ATCC 21149, a diaminopimelic acid-requiring microorganism, is used as the L-threonine-producing seed strain. This strain is cultured for 24 hours in a seed medium having a composition of 20 g./l. of glucose, 10 g./l. of peptone, 10 g./l. of yeast extract, 2.5 g./l. of NaCl and 50 mg./l. of diaminopimelic acid. The resultant seed culture is inoculated in a ratio of 10% by volume into individual 250 ml. triangular flasks each containing 20 ml. of a fermentation medium having the following basal composition:

50 g./l. sucrose
14 g./l. $(NH_4)_2SO_4$
1 g./l. $KH_2PO_4$
0.03 g./l. $MgSO_4 \cdot 7H_2O$
20 g./l. $CaCO_3$ Using this base medium, four different fermentation media are prepared. Two of these include media prepared by adding, individually, 100 mg./l. and 200 mg./l. of diaminopimelic acid, respectively, to the said basal medium (these concentrations are the preferred concentration of diaminopimelic acid for the production of L-threonine with the strain employed herein). Two other fermentation media are prepared by adding to said basal medium a hydrochloric acid hydrolysate of the cell bodies of a glutamic acid-producing strain (a strain of Corynebacterium) at individual concentrations of 10 g./l. and 20 g./l., respectively, calculated for the dry weight of cell bodies before decomposition.

Culturing is then carried out with aerobic shaking of the culture at 30° C. for 96 hours. The results of cultivation in these various media are shown in Table 1. It will be noted that the amounts of L-threonine produced are markedly greater when the cell body decomposate is employed than in the case where diaminopimelic acid is used.

TABLE 1

| Addition to basal medium | Amount of L-threonine produced |
|---|---|
| Diaminopimelic acid, 100 mg./l. | 4.7 mg./ml. |
| Diaminopimelic acid, 200 mg./l. | 4.5 mg./ml. |
| Cell body decomposate, 10 g./l.* | 8.3 mg./ml. |
| Cell body decomposate, 20 g./l.* | 10.4 mg./ml. |

*Calculated for the dry amount of cell bodies before decomposition.

The L-threonine in the resultant culture liquors is recovered by an ion exchange treatment after removing the cell bodies and $CaCO_3$ from the culture liquors.

EXAMPLE 2

The L-threonine-producing strain *Escherichia coli* 29D–2 ATCC 21150 is used as the seed strain. This strain is cultured for 24 hours in a seed medium having a composition of 20 g./l. of glucose, 10 g./l. of peptone, 10 g./l. of yeast extract, 2.5 g./l. of NaCl and 50 mg./l of diaminopimelic acid. The resultant seed strain is inoculated, in a ratio of 10% by volume, into individual 250 ml. triangular flasks each containing 20 ml. of a fermentation medium having the following basal composition:

100 g./l. glucose
20 g./l. $(NH_4)_2SO_4$
1 g./l. $KH_2PO_4$
0.3 g./l. $MgSO_4 \cdot 7H_2O$
30 g./l. $CaCO_3$ As in Example 1, different fermentation media are made up by various additions to the said basal medium. Two of these media comprise the addition of 100 mg./l. and 200 mg./l. of diaminopimelic acid, respectively, to the basal medium (these concentrations of diaminopimelic acid being preferred for producing L-threonine with the strain employed in the present example). Media are also prepared by adding to said basal medium a sulfuric acid hydrolysate of the cell bodies of *Brevibacterium ammoniagenes* at individual concentrations of 10 g./l. and 20 g./l., respectively, calculated for the dry amount of cell bodies before decomposition. A fifth fermentation medium is prepared by adding to said basal medium 100 mg./l. of diaminopimelic acid together with 2 g./l. of the above-mentioned cell body hydrolysate.

Culturing is carried out in the various fermentation media with aerobic shaking at 30° C. for 96 hours. The results of cultivation in these media are shown in Table 2. It can be seen therefrom that the amounts of L-threonine produced in the case where the cell body hydrolysate is used are markedly greater as compared with those obtained in the media in which no such hydrolysate is used.

TABLE 2

| Addition to basal medium | Amount of L-threonine produced |
|---|---|
| Diaminopimelic acid, 100 mg./l. | 3.2 mg./ml. |
| Diaminopimelic acid, 200 mg./l. | 3.3 mg./ml. |
| Diaminopimelic acid, 100 mg./l. plus cell body decomposate, 2 mg./l.* | 5.7 mg./ml. |
| Cell body decomposate, 10 mg./l.* | 6.3 mg./ml. |
| Cell body decomposate, 20 mg./l.* | 8.0 mg./ml. |

*Calculated for the dry amount of cell bodies before decomposition.

EXAMPLE 3

The various strains shown in Table 3 are used as the seed strains. These strains are individually inoculated into large size test tubes in which there is charged into each one 10 ml. of a medium (medium A) having a composition of 100 g./l. of glucose, 20 g./l. of $(NH_4)_2SO_4$, 2 g./l. of peptone, 5 g./l. of yeast extract, 1 g./l. of $K_2HPO_4$, 0.3 g./l. of $MgSO_4 \cdot 7H_2O$, 10 g./l. of L-homoserine and 20 g./l. of $CaCO_3$. This medium has a pH of 7.0.

Inoculations are also effected into large size test tubes each containing 10 ml. of said medium A and a medium (medium B) prepared by adding to said medium A the cell body decomposate described in Example 2, i.e., of Brevibacterium ammoniagenes, at a concentration of 5 g./l. calculated for the dry weight of cell bodies before decomposition.

Culturing is then carried out in these media with aerobic shaking at 30° C. for 72 hours. The amounts of L-threonine produced in the resultant culture liquors are shown in Table 3.

TABLE 3

| Microorganism employed | Amount of L-threonine produced (mg./ml.) | |
|---|---|---|
| | Medium A | Medium B |
| Corynebacterium rathayi ATCC 13659 | 0.2 | 2.1 |
| Xanthomonas citri ATCC 15923 | 0.6 | 2.3 |
| Brevibacterium vitarumen ATCC 10234 | 0.3 | 1.7 |
| Sarcina lutea ATCC 15176 | 0.3 | 1.4 |
| Micrococcus glutamicus ATCC 14308 | 1.0 | 3.1 |

The invention being thus described, it will be obvious that the same may be varied in many ways. Such variations are not to be regarded as a departure from the spirit and scope of the invention, and all such modifications are intended to be included within the scope of the following claims.

We claim:

1. A process for producing L-threonine by fermentation which comprises culturing an L-threonine-producing microorganism under aerobic conditions in an aqueous nutrient medium which includes a decomposate of the cell bodies of microorganisms containing diaminopimelic acid, accumulating L-threonine in the resultant culture liquor, and recovering the L-threonine therefrom.

2. The process of claim 1, wherein said decomposate is employed in the medium in a concentration of from about 1 g./l. to about 200 g./l. based on the dry amount of cell bodies before decomposition.

3. The process of claim 1, wherein said decomposate is obtained by hydrolysis of a diaminopimelic acid-containing microorganism.

4. The process of claim 1, wherein said decomposate is obtained by enzymatic action on a diaminopimelic acid-containing microorganism.

5. The process of claim 1, wherein said decomposate is obtained by autolysis of a diaminopimelic acid-containing microorganism.

6. The process of claim 1, wherein said decomposate comprises the cell bodies of microorganisms containing diaminopimelic acid and belonging to a genus selected from the group consisting of Pseudomonas, Acetobacter, Azotobacter, Escherichia, Aerobacter, Proteus, Propionibacterium, Lactobacillus, Corynebacterium, Brevibacterium, Arthrobacter, Bacillus, Nocardia, Streptomyces, Anabaena, Anacistis and Chlorella.

7. A process for producing L-threonine by fermentation which comprises culturing an L-threonine-producing microorganism belonging to a genus selected from the group consisting of Escherichia, Brevibacterium, Corynebacterium, Xanthomonas, Sarcina, Micrococcus, Vibrio, Bacillus, Proteus and Aerobacter under aerobic conditions in an aqueous nutrient medium which includes a decomposate of the mycelia of microorganisms containing diaminopimelic acid, accumulating L-threonine in the resultant culture liquor, and recovering the L-threonine therefrom.

8. The process of claim 7, wherein culturing is carried out at a temperature of about 20 to 45° C. and at a pH of about 3.0 to 9.0.

9. The process of claim 7, wherein said decomposate comprises the cell bodies of microorganisms containing diaminopimelic acid and belonging to a genus selected from the group consisting of Pseudomonas, Acetobacter, Azotobacter, Escherichia, Aerobacter, Proteus, Propionibacterium, Lactobacillus, Corynebacterium, Brevibacterium, Arthrobacter, Bacillus, Nocardia, Streptomyces, Anabaena, Anacistis and Chlorella.

10. The process of claim 9, wherein said decomposate is employed in the medium in a concentration of from about 1 g./l. to about 200 g./l., based on the dry amount of cell bodies before decomposition.

11. The process of claim 9, wherein said decomposate is obtained by hydrolysis of said diaminopimelic acid-containing microorganisms.

References Cited

UNITED STATES PATENTS 2,937,122   5/1960   Huang _____ 195—47

OTHER REFERENCES

Work, E.: The Biochemical Journal, vol. 49, 1951, pp. 17–23.

Salton, M. R. J.: Biochem et Biophys Acta, vol. 10, No. 4, 1953, p. 518.

A. LOUIS MONACELL, Primary Examiner

G. M. NATH, Assistant Examiner

U.S. Cl. X.R.

195—30, 47